Sept. 9, 1924.  J. BUCKLEY  1,507,951
DEVICE FOR REMOVING LEAVES FROM FRUIT CLEANING LIQUID
Filed Feb. 13, 1924

INVENTOR.
Jerry Buckley
BY
ATTORNEY

Patented Sept. 9, 1924.

1,507,951

UNITED STATES PATENT OFFICE.

JERRY BUCKLEY, OF MILLS, CALIFORNIA.

DEVICE FOR REMOVING LEAVES FROM FRUIT-CLEANING LIQUID.

Application filed February 13, 1924. Serial No. 692,498.

*To all whom it may concern:*

Be it known that I, JERRY BUCKLEY, a citizen of the United States, residing at Mills, county of Sacramento, State of California, have invented certain new and useful Improvements in Devices for Removing Leaves from Fruit-Cleaning Liquid; and I do declare the following to be a full, clear, and exact description of the same, reference being had to the accompanying drawings and to the characters of reference marked thereon, which form a part of this application.

This invention relates to improvements for fruit cleaning apparatus, and particularly to a device for separating the fruit, after being picked from the trees, from the leaves, twigs and other foreign matter inevitably accompanying the fruit.

The present invention is especially intended as an improvement over that form of apparatus shown in my United States Patent No. 1,415,985, dated May 16th, 1922, and my principal object now is to provide a means whereby the leaves, twigs, and any other floatable matter will be automatically and continuously removed from the liquid into which the fruit is dumped, without any attention being necessary on the part of the operator.

This avoids the frequent interruptions in the operation of the device, such as were necessary with the previous device.

Time and labor are therefore conserved, and these are important elements in the expense of operation, especially where large quantities of fruit are being handled.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
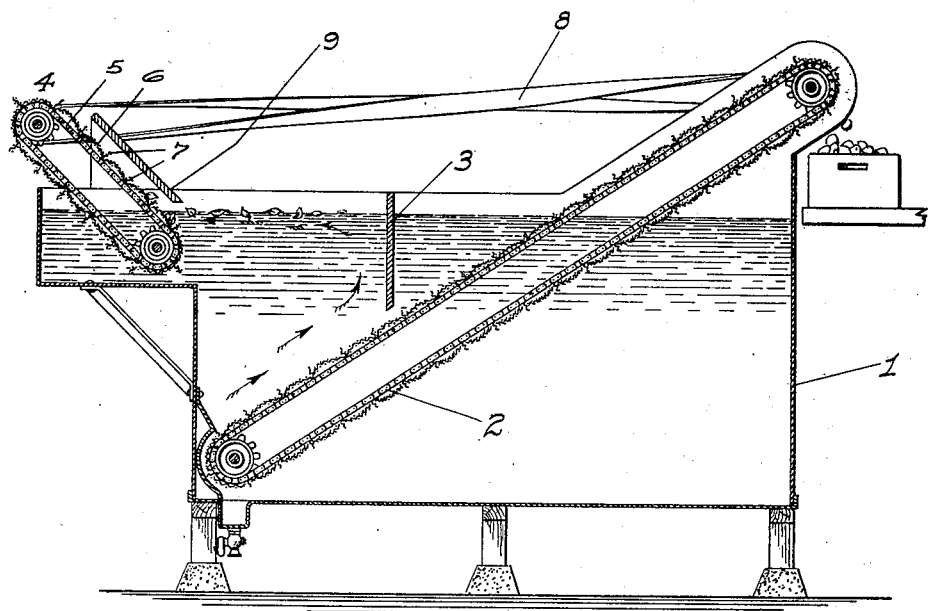
Fig. 1 is a longitudinal section of my improved device.
Figure 2:
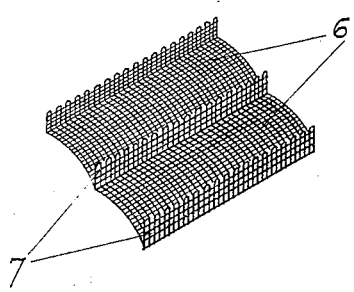
Fig. 2 is a fragmentary detached view of the leaf and other refuse conveyor.

Referring now more particularly to the characters of reference on the drawings, the numeral 1 denotes a tank of suitable size, open on top, and adapted to hold a liquid, preferably water.

An endless driven fruit conveyor 2, of suitable construction such as is outlined in detail in the above mentioned patent, is mounted with one end in and adjacent one end and bottom of the tank, extending thence upwardly at an angle to a suitable point above and beyond the opposite end of the tank.

Fixed in the tank a certain distance from the lower end of the conveyor is a transverse and solid baffle plate or partition 3, extending down from a point above the level of the liquid, to a point suitably clearing the upper run of the conveyor 2.

The fruit to be cleaned is dumped into the tank between the partition and the adjacent end of the tank. The fruit being heavy, will of course sink through the water, until it rests on the conveyor 2, which draws it through and finally out of the water at the other end of the tank.

Any floatable matter previously with the fruit, will rest on the surface of the water, being confined to that area included between the partition and the adjacent end of the tank.

To continuously and automatically remove such matter from the water, I provide an additional endless conveyor 4 which lies at an angle substantially the reverse of that of the conveyor 2. One end of the conveyor 4 is submerged in the water of the above named restricted area adjacent the end of the tank, while the opposite end of said conveyor 4 is above and beyond said adjacent end of the tank. This conveyor extends from side to side of the tank and includes parallel side chains 5 or the like, between which extend transverse strips 6 of screening or other freely perforated material, these strips being arranged to form a complete but flexible flooring from the conveyor.

Transverse cleats 7 of screening or the like project outwardly from the flooring 6 at suitable intervals in the length of the latter.

The conveyors 2 and 4 are driven in common at the same or any desired ratio of speed as by means of a belt 8, which would be crossed to give the proper direction of movement of the conveyors, the upper runs of which both travel upwardly from their lower ends.

In order to prevent any of the fruit when being dumped into the tank, from possibly being caught by the conveyor 4 before said fruit has a chance to enter the water and settle, a deflector or cover board 9 may if desired be placed above the conveyor 2 and parallel thereto, the fruit thus of course striking and rolling down this board and into the water clear of the conveyor 4.

The partition 3 has two important functions. It serves not only to confine the flotable matter to the adjacent end of the tank, but also acts to cause said matter to continuously move into the path of movement of the cleats of the conveyor 4, so that the latter may pick up and withdraw the matter.

This is because with the upward movement of the upper run of the conveyor 2, an upward current of the water in a plane parallel to the conveyor is set up. The moving mass of water, on striking the partition, is deflected thereby and a back flow of the water, and towards the conveyor 4, is set up on the surface of the water. Any matter floating on the water is influenced by the current, and of course also moves toward the conveyor.

A screen partition would of course serve the purpose as far as confining the floating matter is concerned, but to deflect the current as above described, said partition must be solid.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A means for separating foreign material from fruit including a liquid containing tank, a vertical partition wall extending part way into the tank, a conveyor extending to a point near the bottom of the tank and passing closely adjacent the lower edge of the partition wall and to a point outside the tank, a second conveyor extending into the liquid near the surface thereof and to a point outside the tank, the direction of movement of the latter conveyor being the reverse of that of the first named conveyor so that the current of the liquid set up by the movement of the first conveyor will strike the partition wall and be deflected toward the second conveyor whereby when the fruit is emptied into the tank between the second conveyor and the partition wall such current will carry the floatable material associated with the fruit toward the second conveyor by which it will be carried out of the tank, while the clean fruit will fall upon the first conveyor and be carried from the tank thereby.

In testimony whereof I affix my signature.

JERRY BUCKLEY.